E. J. A. RICE.
GATE.
APPLICATION FILED FEB. 24, 1908.
904,647.
Patented Nov. 24, 1908.
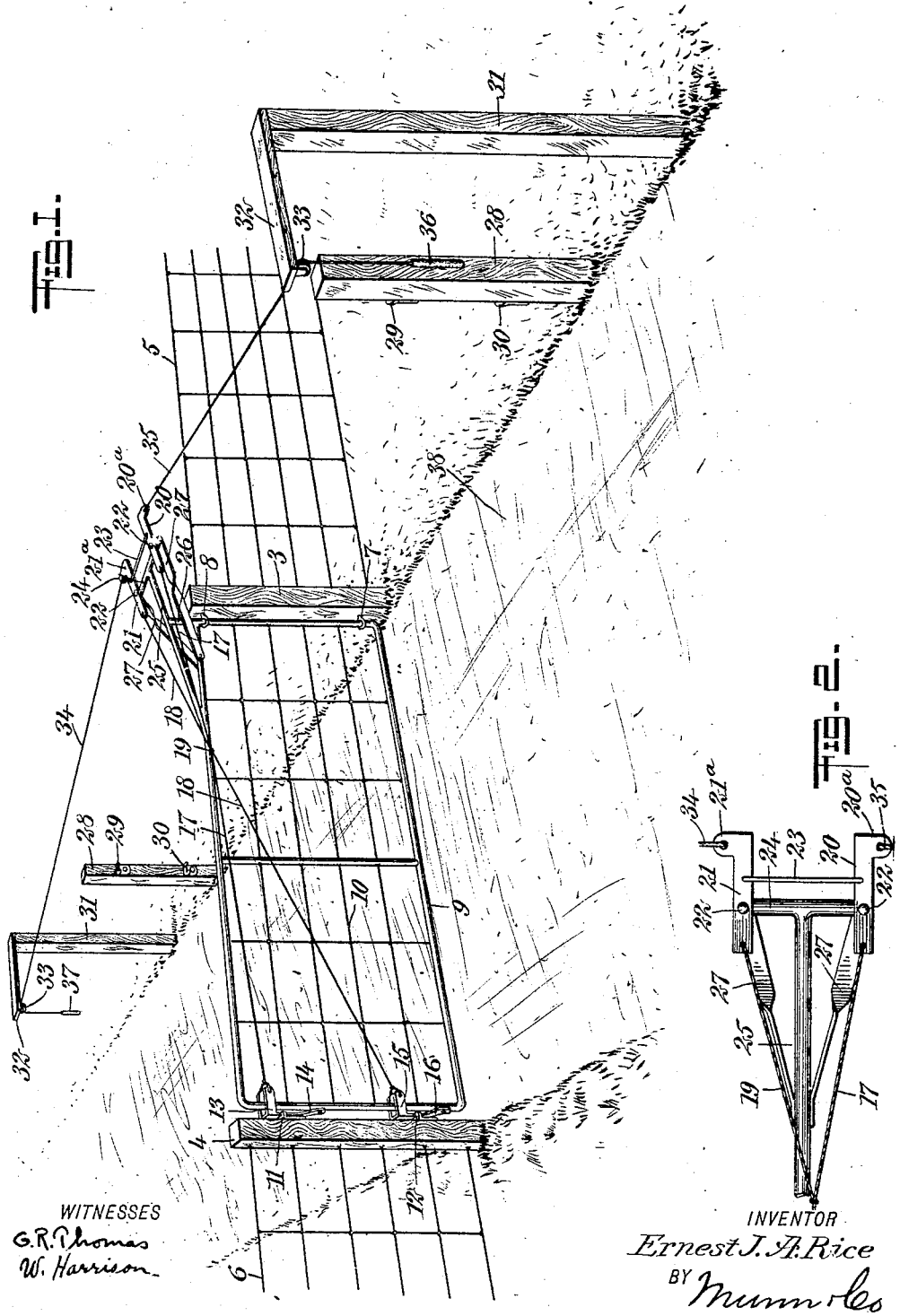
WITNESSES
G. R. Thomas
W. Harrison
INVENTOR
Ernest J. A. Rice
BY Munn & Co
ATTORNEYS

UNITED STATES PATENT OFFICE.

ERNEST J. A. RICE, OF HARVARD, NEBRASKA.

GATE.

No. 904,647.  Specification of Letters Patent.  Patented Nov. 24, 1908.

Application filed February 24, 1908. Serial No. 417,349.

*To all whom it may concern:*

Be it known that I, ERNEST J. A. RICE, a citizen of the United States, and a resident of Harvard, in the county of Clay and State of Nebraska, have invented a new and Improved Gate, of which the following is a full, clear, and exact description.

My invention relates to gates, my more particular improvements relating to the means whereby the gate may be readily operated by a person intending to pass through it, my improvements further tending to render the gate, as far as possible, easy in its action and simple in its construction.

Reference is to be had to the accompanying drawings forming a part of this specification, in which similar characters of reference indicate corresponding parts in both views.

Figure 1 is a perspective showing the gate complete. Fig. 2 is a fragmentary plan of the part used for enabling the operator to manipulate the gate from different positions.

Gate posts are shown at 3, 4 and are disposed upon opposite sides of the road. Wire fences 5, 6 are connected with and partially supported by these gate posts. Mounted upon the post 3 are eyes 7, 8, serving as bearings, and journaled in these bearings is a frame 9 provided with a netting 10, together constituting a movable gate adapted to swing relatively to the post 3. Catches 11, 12 are mounted upon the gate post 4, and a latch 13 is provided with a spring 14 whereby it is mounted upon the frame 9. Another latch 15 is, by aid of a spring portion 16, also mounted upon this frame. These two latches last mentioned are adapted respectively to engage the catches 11, 12 for the purpose of holding the gate in its normal position.

Connected with the latches 13, 15 are wires 17, 18 secured together at a point 19. These wires are connected with levers 20, 21, the latter being pivotally mounted upon pins 22, and connected together by a bar 23. The levers 20, 21 are provided with ears $20^a$, $21^a$, so arranged that if either lever 20 or 21 be moved, the other lever moves also and substantially in a direction parallel therewith.

A tee 24 is provided with an elongated portion 25 mounted upon the frame 9 and extending obliquely upward therefrom. A projection 26, integral with the frame 9, extends upwardly from it and is connected with the portion 25 of the tee. Braces 27 are connected with the outer ends of the tee and also with the upper portion of the frame 9. Catch posts 28 are disposed upon opposite sides of the gate, and occupy, in relation to each other, a general direction in parallel with the roadway. Each post 28 carries catches 29, 30 secured rigidly thereto and adapted to be engaged by the latches 13, 15 whenever the gate is swung open. Posts 31 are also disposed upon opposite sides of the gate and are provided with arms 32 supporting pulleys 33. Cords 34, 35 are provided with handles 36, 37 and extend over these pulleys, being connected with the ears $20^a$, $21^a$. The roadway is shown at 38.

The operation of my device is as follows: The gate being normally closed, as indicated in Fig. 1, a traveler comes along the road. Reaching the handle 36 he gives it a pull downward. This causes the lever 20 to turn, and this lever, acting through the medium of the bar 23, turns the lever 21, the result being that the wire 18 is caused to pull back the latches 13, 15, thus disengaging the latter from the catches 11, 12. The pull upon the outer end of the lever 20 now causes the gate to turn. As the gate swings outwardly, its momentum carries it to the post 28, and the pull upon the handle 36 being released just before the gate reaches this position, the latches 13, 15 snap into the catches 29, 30. This holds the gate firmly in open position. The traveler now passes onward and pulls the other handle 37. This causes the cord 34 to again operate the parallel motion, causing the wires 17, 18 to draw upon the latches 13, 15, thereby releasing them from the catches 29, 30. The pull of the cord 34 also causes the gate to close.

Having thus described my invention, I claim as new and desire to secure by Letters Patent:

1. The combination of a gate post, a gate pivotally mounted thereupon and adapted to swing, a tee mounted upon said gate and provided with a portion extending beyond the pivotal axis of said gate, a pair of levers journaled upon said tee, means for actuating said levers, latch mechanism for temporarily securing the free end of said gate to one of said gate posts, and connections from said latch mechanism to said levers.

2. In a gate, the combination of a gate member pivotally mounted and adapted to swing, a supporting member mounted upon said gate member, a pair of levers each pivotally mounted upon said supporting member, a rod connecting said levers together, means controllable at will for pulling one of said levers so as to turn the same relatively to said support, latch mechanism for holding said gate member in a predetermined position, and connections from said levers to said latch mechanism.

3. The combination of a gate member pivotally mounted and adapted to swing, a brace extending upwardly from one end of said gate member, a tee provided with an elongated portion connected with said gate member, and with said brace, levers pivotally mounted upon different portions of said tee, mechanism connecting said levers together so that a movement of one of said levers causes a corresponding movement of the other of said levers, latch mechanism for holding said gate member in a predetermined relative position, connections from said levers to said latch mechanism for operating the latter, and means controllable at will and connected with said levers for the purpose of turning the same relatively to said tee upon which they are mounted.

4. In a gate, the combination of a gate post, a gate member pivotally mounted thereupon and adapted to swing, a brace extending upwardly from said gate member and substantially in alinement with the pivotal axis of said gate, a tee connected rigidly with the upper edge of said gate and engaging said brace, said tee extending beyond the pivotal support of said gate as compared with the general elongation of said gate member relatively to said pivotal point of support, levers journaled upon the outer ends of said tee, a cross bar connecting said levers together, latch mechanism for holding said gate temporarily in a predetermined position, connections from said levers to said latch mechanism, and means controllable at will and connected with said levers for actuating the latter.

In testimony whereof I have signed my name to this specification in the presence of two subscribing witnesses.

ERNEST J. A. RICE.

Witnesses:
E. M. BENGTSON,
THEO. FRIESS.